Nov. 8, 1960  A. TANAKA ET AL  2,959,208
SEAT ADJUSTING MECHANISM
Filed Dec. 17, 1956  4 Sheets-Sheet 1
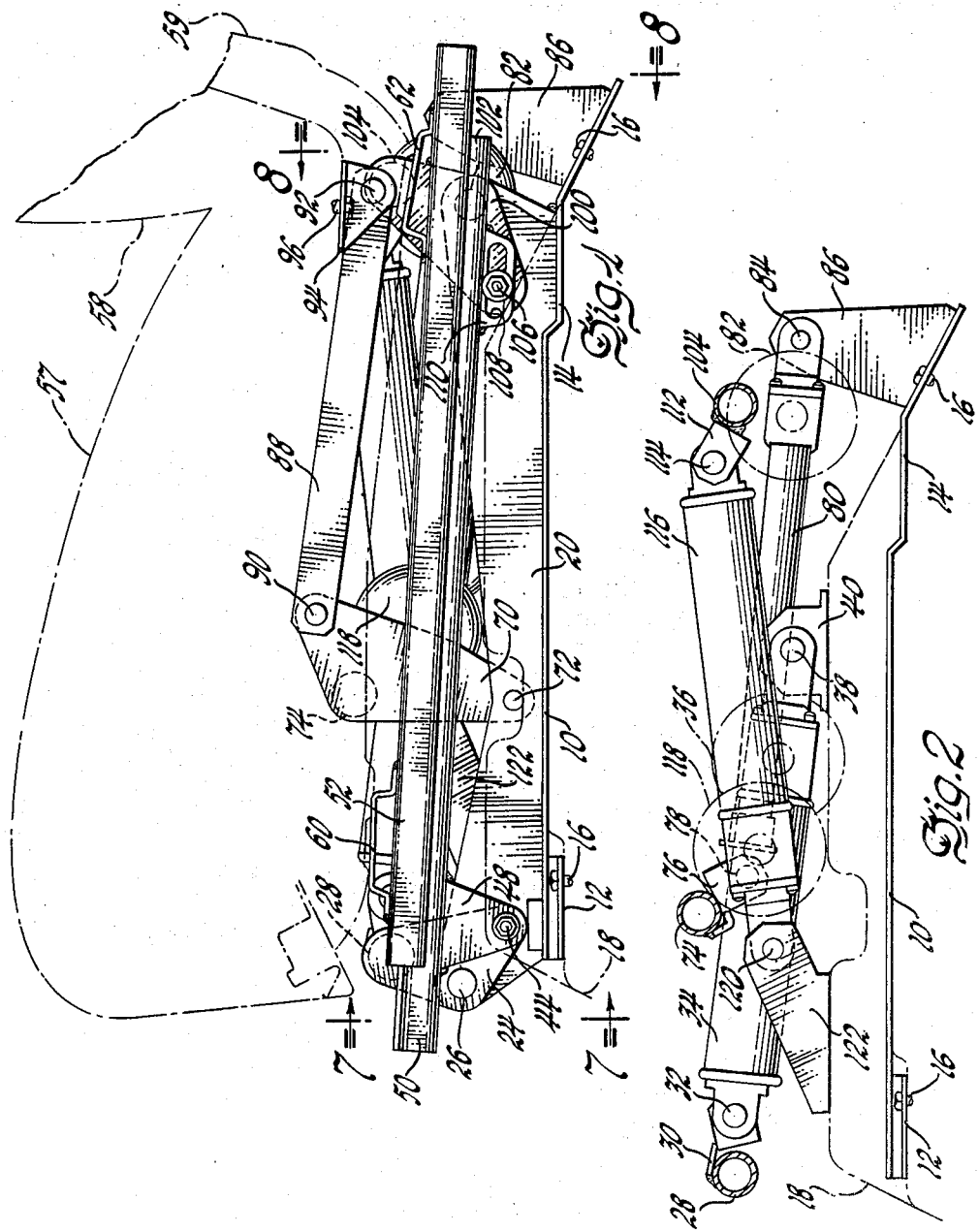
INVENTORS
Akira Tanaka &
BY Nicholas Tozuk
W. S. Pettigrew
ATTORNEY

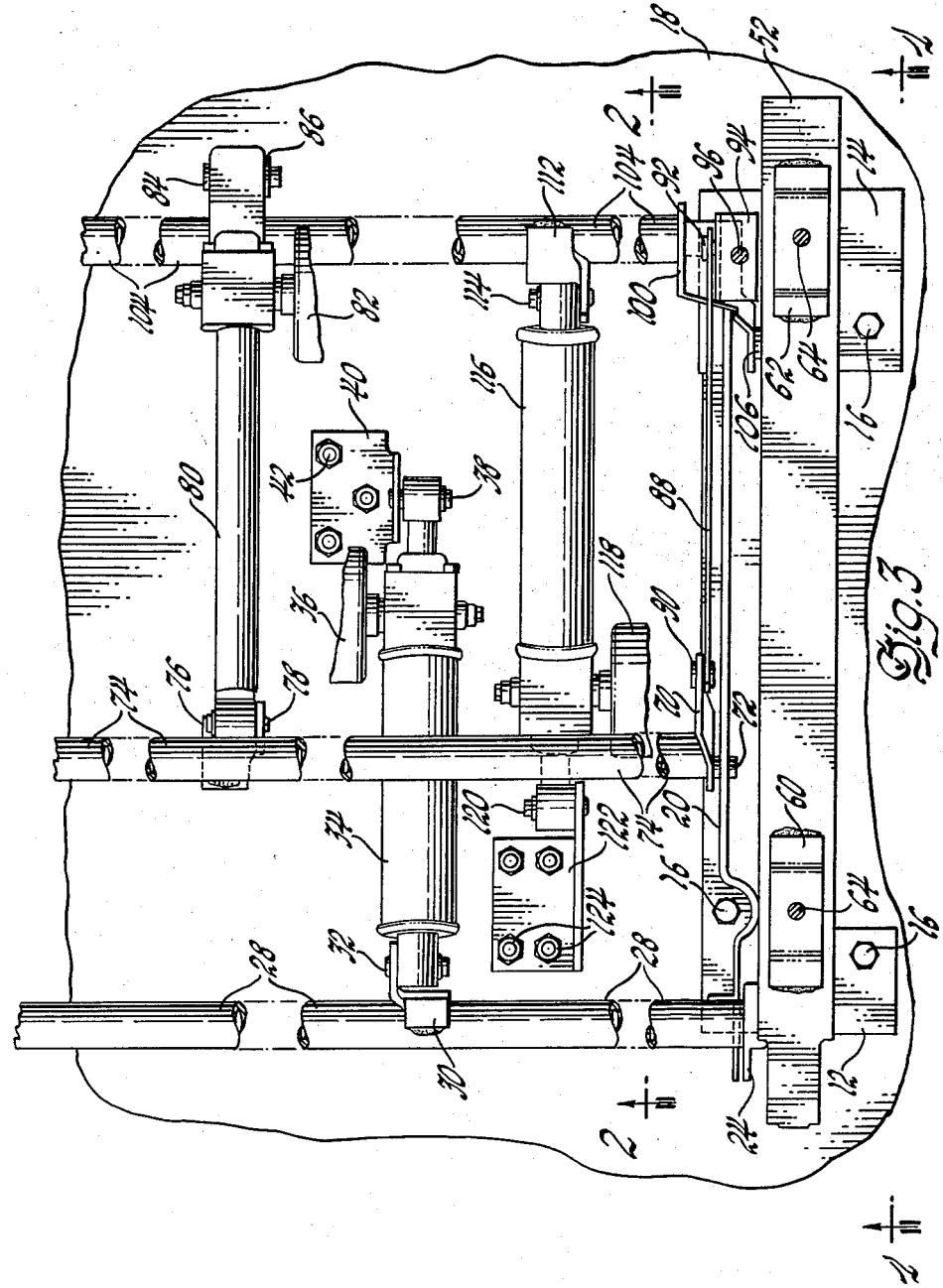

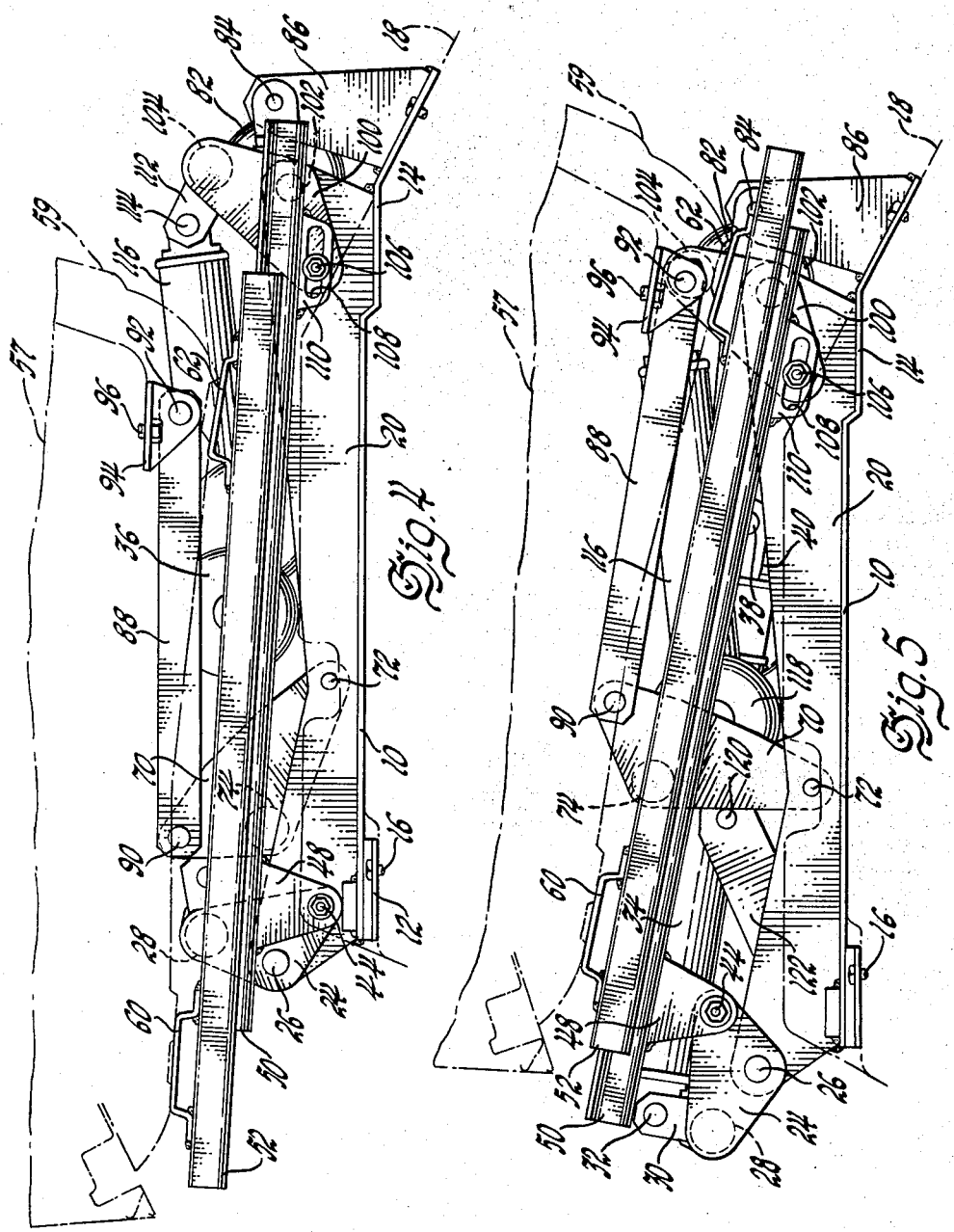

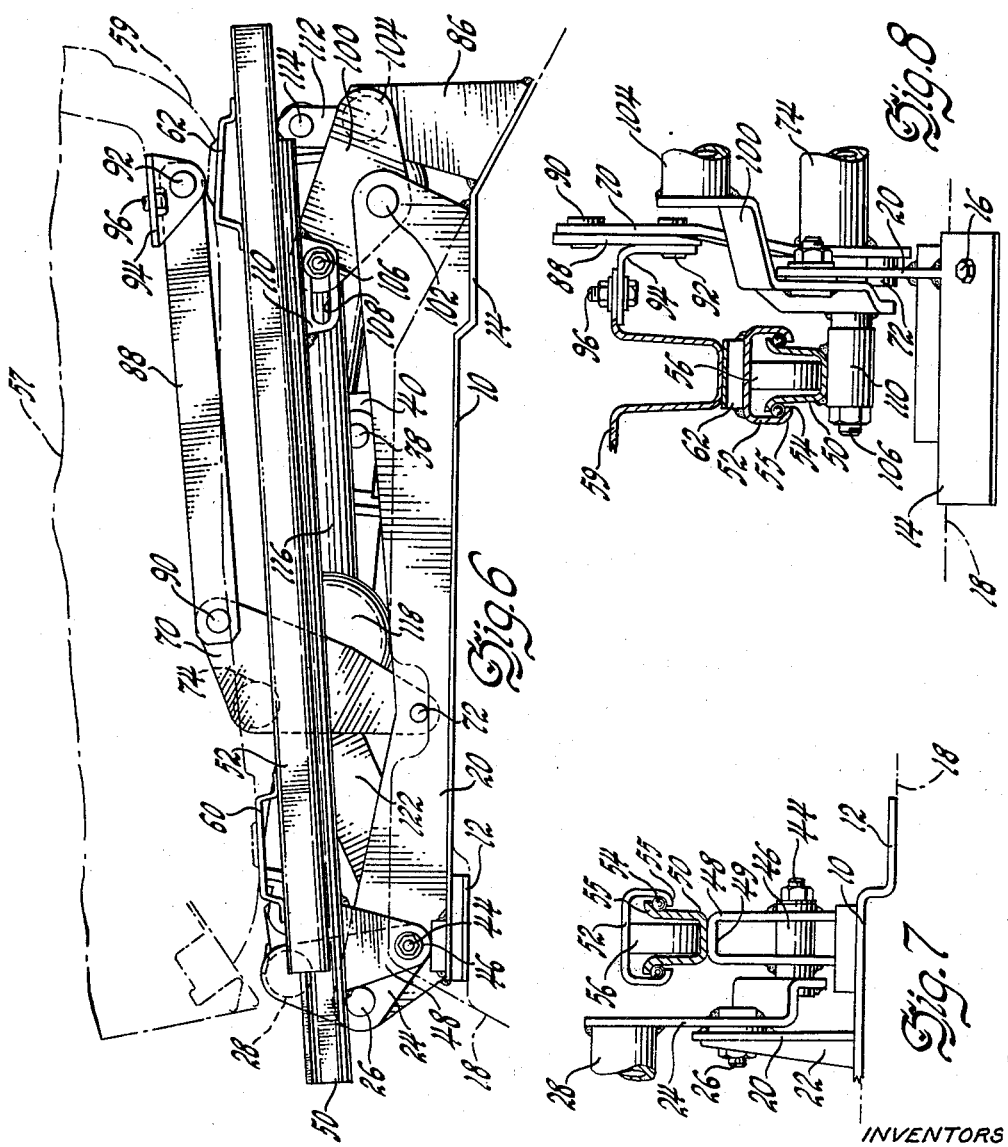

United States Patent Office 2,959,208
Patented Nov. 8, 1960

2,959,208

SEAT ADJUSTING MECHANISM

Akira Tanaka, Southfield Township, and Nicholas Toruk, Melvindale, Mich., assignors to General Motors Corporation, Detroit, Mich., a corporation of Delaware Filed Dec. 17, 1956, Ser. No. 628,623

6 Claims. (Cl. 155—14)

This invention relates to seat adjusting mechanisms and more particularly to power operated seat adjusting mechanisms for horizontal and vertical adjustment of vehicle seats.

The seat adjusting mechanism of this invention is power operated for horizontal movement so as to be adjusted in fore and aft directions with respect to the body and is also power operated for vertical movement selectively and independently of horizontal movement. The vertical adjustment is arranged so that the front and rear portions of the mechanism may be adjusted selectively and independently of each other in either vertical direction so as to position the mechanism in various tilted positions with respect to the horizontal. Therefore, one portion of the mechanism may be adjusted in either vertical direction regardless of whether the other portion of the mechanism is not adjusted, is adjusted in the same vertical direction, or is adjusted in an opposite vertical direction. Thus, the front and rear portions of the seat may be simultaneously adjusted in either vertical direction or one portion may be adjusted in one vertical direction while the other portion is simultaneously adjusted in the other vertical direction.

The horizontal adjustment of the mechanism is arranged so that the seat may be adjusted horizontally independently of adjustment of the front and rear portions of the seat. In addition, the horizontal adjustment acts to maintain the seat in substantially the same horizonal position regardless of whether either or both portions of the seat are vertically adjusted.

The primary object of this invention is to provide a new and improved power operated vehicle seat adjusting mechanism which is adjustable in both horizontal and vertical directions. Another object of this invention is to provide a vehicle seat adjusting mechanism wherein the front and rear portions of the mechanism may be vertically adjusted in either direction selectively and independently of each other to position the seat in various tilted positions with respect to the horizontal. A further object of this invention is to provide a vehicle seat adjusting mechanism which may be adjusted in horizontal directions selectively and independently of adjustment in vertical directions and wherein the front and rear portions of the mechanism may be selectively and independently adjusted in either vertical direction. Yet, another object of this invention is to provide a vehicle seat adjusting mechanism wherein the front and rear portions of the mechanism may be adjusted selectively and independently of each other and wherein the horizontal adjusting mechanism is operative to maintain the seat substantially in the same horizontal position regardless of vertical adjustment of the seat.

These and other objects of this invention will be readily apparent from the following specification and drawings, in which:

Figure 1 is a side elevational view of a vehicle seat adjusting mechanism according to this invention with the mechanism being positioned in its rear horizontal limit position and its lower vertical limit position;

Figure 2 is a sectional view taken on the plane indicated by line 2—2 of Figure 3;

Figure 3 is a plan view of a portion of the adjusting mechanism of the seat;

Figure 4 is a view similar to Figure 1 but showing the mechanism in its forward horizontal limit position and in its lower vertical limit position;

Figure 5 is a view showing the mechanism in its rear horizontal limit position with the forward portion of the mechanism being in its upper vertical limit position and the rear portion of the mechanism being in its lower vertical limit position;

Figure 6 is a view showing the mechanism in its rear horizontal limit position with the front portion of the mechanism being in its lower vertical limit position and the rear portion of the mechanism being in its upper vertical limit position;

Figure 7 is a partial view taken on the plane indicated by line 7—7 of Figure 1; and Figure 8 is a partial view taken on the plane indicated by line 8—8 of Figure 1.

Before proceeding with a description of the mechanism of this invention, it will be understood that a pair of seat adjusting mechanisms are provided for the seat, one on either side thereof. Since each mechanism is the same, although of different hand, only one of the seat adjusting mechanisms is shown and will be described.

Referring now particularly to Figures 1, 3, and 7, a support bracket 10 includes front and rear laterally outwardly extending flanges 12 and 14, respectively, which are bolted at 16 to the vehicle floor pan 18 in order to fixedly mount the support bracket on the vehicle body. The support bracket further includes a laterally upwardly extending web 20 which may be strengthened adjacent the forward end thereof by means of a rib 22 which is welded or otherwise secured to web 20 and to bracket 10.

A bell crank lever 24 is pivotally secured to web 20 at 26 and has its upper leg welded or otherwise secured to a front vertical equalizer rod 28 which spans the seat transversely thereof, as can be seen in Figure 3. A bracket 30 is welded or otherwise secured to rod 28 and is pivotally secured at 32 to one end of an extendible and retractable screw jack assembly 34 which is driven by an electric motor 36. The other end of the screw jack assembly is pivotally secured at 38 to an angular bracket 40 bolted to the vehicle floor pan 18 at 42. As can be seen particularly in Figure 7, the lower offset leg of the bell crank lever 24 is pivotally secured to a stud 44 which is rotatably mounted within a bushing 46. Bushing 46 extends between the side walls of a generally U-shaped bracket 48 and is welded or otherwise secured to the bracket. The base web 49 of bracket 48 is welded or otherwise secured to a lower seat slide channel 50 adjacent the forward end thereof. The lower seat slide channel 50 is received within an upper seat slide channel 52, with a plurality of ball bearings 54 being received between the opposed arcuate terminal flanges 55 of the channels and a plurality of roller bearings 56 being received between the webs of the channels. The ball bearings 54 and roller bearings 56 slidably mount the upper channel 52 on the lower channel 50 for horizontal adjustment of the upper channel in fore and aft directions of the body with respect to the lower channel.

As may be seen particularly in Figure 1, the vehicle seat includes a seat cushion 57 and a seat back 58 which are supported by a seat frame 59. Front and rear generally U-shaped brackets 60 and 62, respectively, welded or otherwise secured to the upper channel 52 adjacent the front and rear ends thereof are secured in a suitable manner such as by bolts 64 to the seat frame 59 in order to fixedly secure the seat frame to the upper channel.

The bell crank lever 24 which is pivotally mounted on web 20 of bracket 10 at 26 controls vertical adjustment of the front portion of the mechanism to vertically adjust the front portion of the seat.

Referring now to Figures 1, 3, and 5, if the electric motor 36 is operated in a direction so as to extend the screw jack 34, the front vertical equalizer rod 28 will be moved forwardly as lever 24 swings in a counterclockwise direction about the pivot 26 to thereby raise the front portion of the seat as the bracket 48 is moved upwardly and in turn moves the front ends of the upper and lower channels 52 and 50 upwardly. The adjusting mechanism and the seat will thus be moved from their position of Figure 1 to their position of Figure 5. Similarly, if the motor 36 is operated in the reverse direction so as to retract the screw jack 34, the front vertical equalizer rod 28 will be moved rearwardly as lever 24 swings clockwise about its pivot 26 to lower the front portion of the seat as the lever lowers bracket 48 to move the front ends of the upper and lower channels 52 and 50 downwardly and move the adjusting mechanism and the seat from their position of Figure 5 to their position of Figure 1.

A lever 70 is pivotally secured to the web 20 of bracket 10 at 72 rearwardly of the lever 24. A horizontal equalizer rod 74 is welded or otherwise secured to the lever 70 and spans the seat transversely thereof. A bracket 76 welded to rod 74 is pivotally secured at 78 to one end of a screw jack assembly 80 similar to assembly 34 and driven by an electric motor 82. The other end of the screw jack assembly is pivotally secured at 84 to bracket 86 which is welded or otherwise secured to the vehicle floor pan, as may be seen in Figures 1 and 6. A shiftable link 88 has the forward end thereof pivotally secured at 90 to lever 70 and the rearward end thereof pivotally secured at 92 to an angular bracket 94 which is fixed to the vehicle seat frame 58 by a bolt 96, as may be seen in Figure 8.

Referring now particularly to Figures 1, 3, and 4, if motor 82 is operated in a direction so as to extend the screw jack 80, the horizontal equalizer rod 74 will be moved forwardly as lever 70 swings in a counterclockwise direction about its pivot 72 and shifts link 88 forwardly. As the link shifts forwardly, it will move the seat forwardly to its forward limit position as the upper channel 52 moves forwardly on the lower channel 50 which is stationary. Thus, the seat adjusting mechanism and the seat will be moved from their position of Figure 1 to their position of Figure 4. Similarly, if the motor 82 is operated in the reverse direction so as to retract the screw jack 80, the horizontal equalizer rod 74 will be moved rearwardly as lever 70 swings in a clockwise direction about its pivot 72 and shifts link 88 rearwardly to move the seat rearwardly to its rear limit position as the upper channel 52 slides relative to the lower channel 50. Thus, the seat adjusting mechanism and the seat will be moved from their position of Figure 4 to their position of Figure 1.

A bell crank lever 100 is pivotally secured at 102 to the web 20 of bracket 10. The lower leg of the bell crank is welded or otherwise secured to a rear vertical equalizer rod 104 which spans the seat transversely thereof and passes beneath the screw jack 80. The upper leg of the bell crank 100 fixedly mounts an outwardly extending stud 106 which is slidably received within a slot 108 of a lug 110 welded or otherwise secured to the lower channel 50 adjacent the rear end thereof, with slot 108 being substantially parallel to the upper and lower seat slide channels. As may be seen particularly in Figure 3, a bracket 112 is welded to the rear vertical equalizer rod 104 and is pivotally secured at 114 to one end of an extendible and retractable screw jack assembly 116 similar to assemblies 34 and 80. The screw jack assembly is driven by an electric motor 118 and has its other end thereof pivotally secured at 120 to an angular bracket 122 bolted to the floor pan at 124.

Referring now particularly to Figures 3, 5, and 6, if the electric motor 118 is operated in a direction so as to extend the screw jack 116, the equalizer rod 104 will be shifted rearwardly as lever 100 swings in a clockwise direction about pivot 102 to raise the rear ends of the channels 50 and 52 and the rear portion of the seat as the stud 106 slides rearwardly in the slot 108 of lug 110. Thus, the seat adjusting mechanism and the seat will be moved from their position of Figure 5 to their position of Figure 6. Similarly, if the electric motor 118 is operated in a reverse direction so as to retract the screw jack 116, the equalizer rod 104 will be shifted forwardly as bell crank lever 100 swings in a counterclockwise direction about its pivot 102 to lower the rear ends of channels 50 and 52 and the rear portion of the seat as the stud 106 slides forwardly in slot 108 of lug 110. Thus, the seat adjusting mechanism and the seat will be moved from their position of Figure 6 to their position of Figure 5.

The provision of the lost motion connection of stud 106 and slot 108 between the bell crank lever 100 and the seat slide channels allows the front portion of the seat adjusting mechanism to be vertically adjusted independently of the rear portion of the seat adjusting mechanism and similarly allows the rear portion of the seat adjusting mechanism to be adjusted independently of the front portion of the seat adjusting mechanism.

As the front portion of the seat and the adjusting mechanism are vertically adjusted from their position of Figure 1 to their position of Figure 5, the lever 24 and pivot 44 will move counterclockwise in a fixed arc about the pivot 26 while the slide channels 50 and 52 and the seat swing clockwise about the pivot defined by the stud 106. The provision of the slot 108 and stud 106 allows the lower slide channel to both pivot and slide about the stud 106 to allow the slide channels to swing clockwise while the lever 24 and pivot 44 swing counterclockwise. As the seat is initially raised, the channel 50 will move rearwardly with respect to stud 106 until the pivot 44 and the pivot 26 come into alignment with the stud 106. As the pivot 44 thereafter continues to move upwardly above this alignment, the slide channel 50 will begin to move forwardly with respect to the stud 106 as the front portion of the seat and the mechanism are located in their position of Figure 5. Thus, the provision of the stud 106 in slot 108 allows the seat and the slide channels to swing in one direction about a slidable and movable pivot while the adjusting lever 24 swings in an opposite direction about a fixed pivot 26.

Similarly, when the front portion of the seat and the adjusting mechanism are vertically adjusted from their position of Figure 5 to their position of Figure 1, the lever 24 will swing clockwise so as to move the pivot 46 in the same direction in a fixed arc about the pivot 26 as the seat and slide channels swing in a counterclockwise direction about the slidable pivot connection defined by the slot 108 and stud 106. As the seat initially moves from its position of Figure 5 to its position of Figure 1, the slide channel 50 will move rearwardly relative to stud 106 until the pivots 26 and 44 are in alignment with stud 106. Thereafter, as the pivot 44 moves downwardly below this alignment, the slide channel 50 will move forwardly relative to the stud 106. It will be noted that the slide channel 50 is movable independently of the slide channel 52 throughout vertical adjustment of the front portion of the seat and the adjusting mechanism.

When the rear portion of the seat and the seat adjusting mechanism are vertically adjusted from their position of Figure 5 to their position of Figure 6, the stud 106 will move clockwise in a fixed arc about the pivot 102 while the seat and the slide channels will swing counterclockwise about the pivot 44. As the seat and slide channels initially move toward their position of Figure 6, the stud 106 will move forwardly in slot 108 until the stud 106, pivot 102, and pivot 44 move into alignment with each other. Thereafter, as the stud 106 moves about this position of alignment the stud will move rearwardly within slot 108 and will be positioned substantially at the rear end of the slot when the seat has moved to its position of Figure 6. Thus, the provision of the stud 106 and slot 108 allows the lever 100 and stud 106 to swing clockwise about the pivot 102 while the seat and slide channels swing counterclockwise about the pivot 44. When the rear portion of the seat and the seat adjusting mechanism are vertically adjusted from their position of Figure 6 to their position of Figure 5, the stud 106 and lever 100 swing counterclockwise about the pivot 102 while the seat and slide channels swing clockwise about pivot 44. Again the provision of the stud 106 and the slot 108 allows this opposite swinging movement of the adjusting lever 100 and the seat and slide channels. The stud 106 initially moves forwardly in the slot 108 until the stud 106 comes into alignment with pivots 44 and 102 and thereafter the stud moves rearwardly within the slot 108 as the stud moves below this position of alignment and the seat and adjusting mechanism return to their position of Figure 5.

As has been previously mentioned, the slide channels 50 and 52 are movable independently of each other when either portion of the seat is vertically adjusted. This feature of the invention allows the link 88 to control the horizontal position of the seat regardless of the vertical position of the seat since the link can only swing about pivot 90 in an arc which is different than the arc of movement of the seat about either pivot 26 or stud 106. Thus, as the front portion of the seat and the seat adjusting mechanism are vertically adjusted from their position of Figure 1 to their position of Figure 5, the link 88 will initially move the upper channel 52 forwardly with respect to the lower channel 50 until pivots 26, 44, and 102 come into alignment, since the link swings in an arc having a smaller radius than the arc of swinging movement of the seat. This will act to maintain the seat in substantially the same horizontal position as in Figure 1 since the link counteracts the horizontally rearward movement of the seat caused by counter clockwise movement of lever 24. Thereafter, as the pivot 44 moves above the position of alignment and the front portion of the seat and the seat adjusting mechanism move to their position of Figure 5, the link 88 will move the upper channel 52 rearwardly of the lower channel 50 to maintain the seat in substantially the same horizontal position in Figure 5 as in Figure 1. When the front portion of the seat and the seat adjusting mechanism are moved from their position of Figure 5 to their position of Figure 1, link 88 will operate in the reverse manner since lever 24 swings in the opposite direction.

When the rear portion of the seat and the seat adjusting mechanism are moved from their position of Figure 5 to their position of Figure 6, link 88 will initially move the upper channel 52 rearwardly of the lower channel 50 until pivots 102, 106, and 44 move into alignment and will then move the upper channel 52 forwardly of the lower channel 50 as pivot 106 moves above the position of alignment and the rear portion of the seat and the seat adjusting mechanism move to their position of Figure 6. Thus, link 88 counteracts the clockwise swinging movement of lever 100 tending to move the seat horizontally as the rear portion of the seat is vertically adjusted. When the rear portion of the seat and the seat adjusting mechanism are moved from their position of Figure 6 to their position of Figure 5, link 88 acts in a reverse manner since lever 100 swings in an opposite direction.

It will be noted that the upper channel 52 moves oppositely to the lower channel 50 as either portion of the seat is vertically adjusted. Thus, the link 88 acts to maintain the seat in substantially the same horizontal position regardless of the vertical position of the seat.

When both the front and rear portions of the seat are simultaneously vertically adjusted, the pivot 44 will move, as previously described in conjunction with Figures 1 and 5, while the stud 106 will move as previously explained in conjunction with Figures 5 and 6 and, therefore, no further description is believed necessary. It will be noted, of course, that both stud 106 and slot 108 will move relative to each other rather than one moving relative to the other. Link 88 will again act to maintain the seat in substantially the same horizontal position throughout vertical movement thereof.

From the preceding description, it will be noted that either the front or the rear portions of the seat may be adjusted in either vertical direction regardless of the position of the other portion of the seat. Similarly, both the front and rear portions of the seat may be simultaneously raised or simultaneously lowered and one portion may be raised while the other may be lowered. In addition, the horizontal adjustment of the seat is selective and independent of the vertical position of the seat and the seat may be adjusted in both horizontal and vertical directions at the same time.

Thus, this invention provides a vehicle seat wherein the front and rear portions of the seat may be adjusted selectively and independently of each other regardless of the position of the other portion of the seat and whether the other portion of the seat is simultaneously adjusted in the same or in an opposite vertical direction.

It will be appreciated that the vehicle seat of this invention will have universal use since each portion of the seat may be simultaneously adjusted vertically while the seat is also being adjusted horizontally.

What is claimed is:

1. The combination comprising a support, first and second vertical adjusting levers pivotally mounted on said support for swinging movement relative thereto, actuating means operatively connected to said levers for selectively swinging said levers relative to said support, a seat slide structure including a pair of horizontally adjustable members, means pivotally connecting said first lever to one of said members adjacent one end thereof, lost motion means pivotally and slidably connecting said second lever to said one member adjacent the other end thereof whereby said first lever is selectively swingable relative to said support to position said one end of said one member at various vertical positions relative to said support while said other end thereof pivots and slides relative to said second vertical adjusting lever, and third lever means swingably mounted on said support and operatively secured by link means to the other member of said slide structure to control the horizontal position thereof as said one member moves horizontally relative thereto and to said second vertical adjusting lever during swinging movement of said one lever.

2. The combination comprising a support, first and second vertical adjusting levers pivotally mounted on said support for swinging movement relative thereto, actuating means operatively connected to said first and second levers for selectively swinging said levers relative to said support, a seat slide structure including a pair of horizontally adjustable members, means pivotally connecting said first lever to one of said members adjacent one end thereof, lost motion means pivotally and slidably connecting said second lever to said one member adjacent the other end thereof whereby said second lever is selectively swingable relative to said support to position said other end of said one member at various vertical positions with respect to said support as said other end pivots and slides relative to said second lever while said one end pivots relative to said first lever, and third lever means swingably mounted on said support and operatively secured to the other member of said slide structure to control the horizontal position thereof as said one member moves horizontally relative thereto and to said second lever during swinging movement of said second lever.

3. The combination comprising a pair of spaced seat adjusting mechanisms, each of said mechanisms including a support, first and second vertical adjusting levers pivotally mounted on said support for swinging movement relative thereto, a seat slide structure including a pair of horizontally adjustable members, means pivotally connecting said first lever to one of said members adjacent one end thereof, lost motion means pivotally and slidably connecting said second lever to said one member adjacent the other end thereof whereby said first and second levers are selectively and alternately swingable in opposite directions relative to said support to position said one member at various vertical positions with respect thereto, said lost motion means allowing said one member to move relative to said second lever upon swinging movement of either lever, third lever means pivotally mounted on each of said supports, intermediate means pivotally interconnecting said lever and said other member of each of said slide structures to control the horizontal position thereof as said one member moves horizontally relative thereto and to said second lever, a pair of torque rods interconnecting opposite first and second adjusting levers of each of said adjusting mechanisms to provide for simultaneous operation thereof, and actuating means operatively connected to each of said torque rods for selectively moving said torque rods relative to said support to thereby selectively swing said opposite first and second adjusting levers relative to said support.

4. The combination comprising a support, first and second vertical adjusting levers pivotally mounted on said support for swinging movement relative thereto, actuating means operatively connected to said levers for selectively swinging said levers relative to said support, a seat slide structure including a pair of horizontally adjustable members, means pivotally connecting said first lever to one of said members adjacent one end thereof, lost motion means pivotally and slidably connecting said second lever to said one member adjacent the other end thereof whereby said first lever is selectively swingable relative to said support to position said one end of said one member at various vertical positions with respect to said support while said other end thereof pivots and slides relative to said second lever, and a pair of pivotally connected links interconnecting said support and said other member of said slide structure to control the horizontal position thereof as said one member moves horizontally relative thereto and to said second lever during swinging movement of said first lever.

5. The combination comprising a support, first and second vertical adjusting levers pivotally mounted on said support for swinging movement relative thereto, actuating means operatively connected to said levers for selectively swinging said levers relative to said support, a seat slide structure including a pair of horizontally adjustable members, means pivotally connecting said first lever to one of said members adjacent one end thereof, lost motion means pivotally and slidably connecting said second lever to said one member adjacent the other end thereof whereby said first lever is selectively swingable relative to said support to position said one end of said one member at various vertical positions with respect thereto while said other end thereof pivots and slides relative to said second lever, a third lever swingably mounted on said support, a link pivotally interconnecting said third lever and said other member of said slide structure to control the horizontal position of said other member as said one member moves horizontally relative thereto and to said second lever, and actuating means operatively connected to said third lever for selectively swinging said third lever relative to said support regardless of swinging movement of said first lever to horizontally adjust the other member relative to said one member during vertical adjustment of said one end of said one member.

6. The combination comprising a support, first and second vertical adjusting levers pivotally mounted on said support for swinging movement relative thereto, actuating means operatively connected to said levers for selectively swinging said levers relative to said support, a seat slide structure including a pair of horizontally adjustable members, means pivotally connecting said first lever to one of said members adjacent one end thereof, lost motion means pivotally and slidably connecting said second lever to said one member adjacent the other end thereof whereby said second lever is selectively swingable relative to said support to position said other end of said one member at various vertical positions with respect thereto as said other end pivots and slides relative to said second lever while said one end pivots relative to said first lever, a third lever swingably mounted on said support, link means pivotally interconnecting said third lever and said other member of said slide structure to control the horizontal position of said other member as said one member moves horizontally relative thereto and to said second vertical adjusting lever, and actuating means operatively connected to said third lever for selectively swinging said third lever relative to said support regardless of swinging movement of said second lever to horizontally adjust said other member relative to said one member.

References Cited in the file of this patent

UNITED STATES PATENTS

| | | |
|---|---|---|
| 2,076,309 | Whedon | Apr. 6, 1937 |
| 2,345,182 | Corber | Mar. 28, 1944 |
| 2,609,029 | Haberstump | Sept. 2, 1952 |
| 2,765,024 | Brundage | Oct. 2, 1956 |
| 2,784,764 | Rigby et al. | Mar. 12, 1957 |
| 2,791,263 | Chayne | May 7, 1957 |
| 2,797,733 | Sherman | July 2, 1957 |

FOREIGN PATENTS

| | | |
|---|---|---|
| 907,859 | Germany | Jan. 24, 1955 |

UNITED STATES PATENT OFFICE
CERTIFICATION OF CORRECTION

Patent No. 2,959,208            November 8, 1960

Akira Tanaka et al.

It is hereby certified that error appears in the above numbered patent requiring correction and that the said Letters Patent should read as corrected below.

Column 6, line 74, for "and operatively secured to the other member of said" read -- and operatively secured by link means to the other member of said --.

Signed and sealed this 23rd day of May 1961.

(SEAL)
Attest:

ERNEST W. SWIDER                      DAVID L. LADD
Attesting Officer                    Commissioner of Patents